United States Patent Office 3,544,683
Patented Dec. 1, 1970

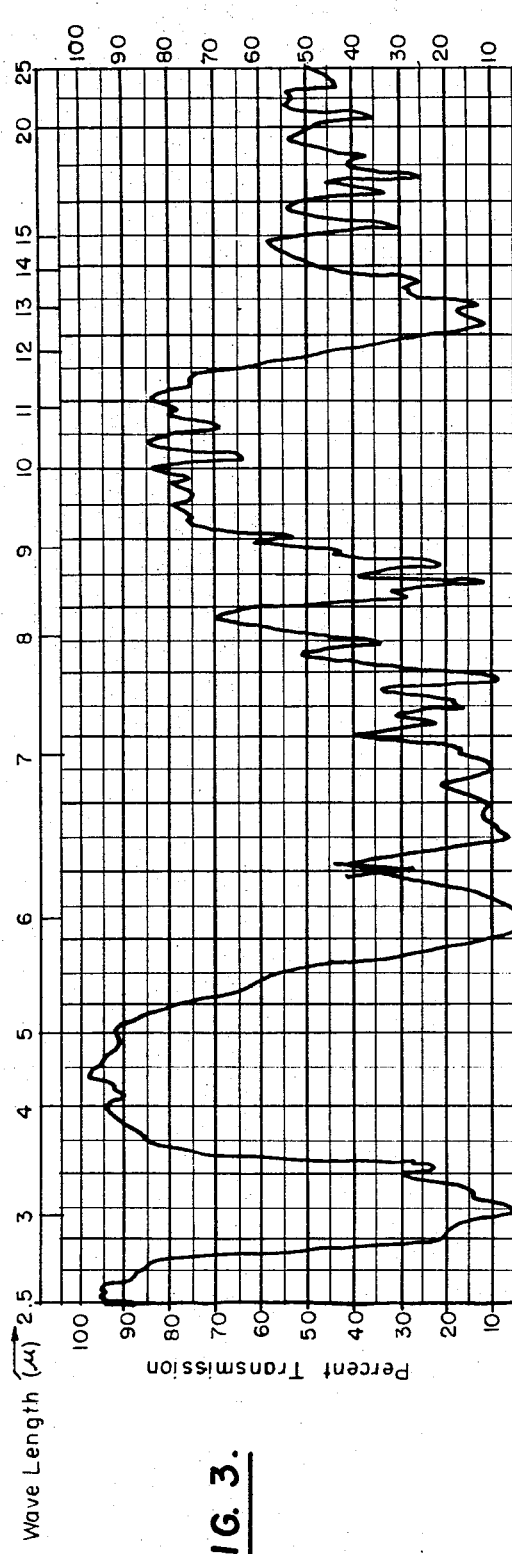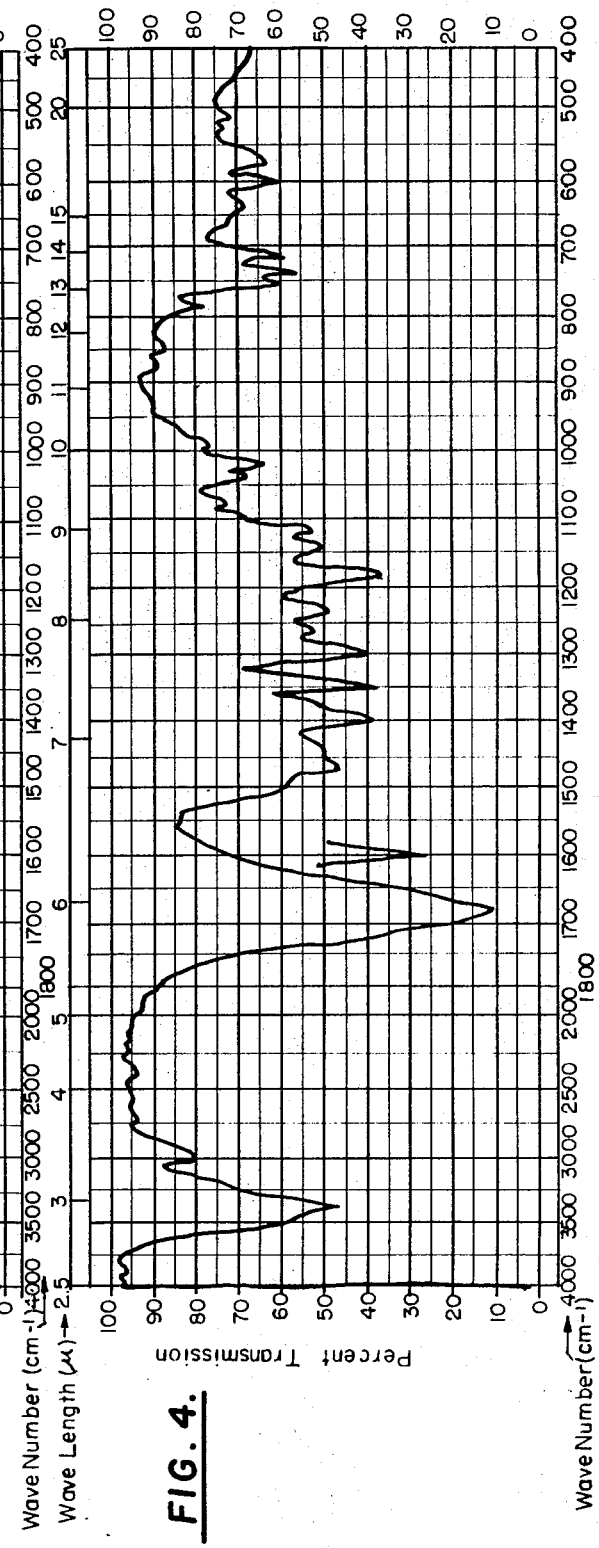

3,544,683
ACTIVE-CHLORINE-CONTAINING COMPOUND
Tsunezo Ushioda, 448 Horinouchi, 2-chome, Suginami-ku, Tokyo-to, Japan; and Katsuhiko Nonaka, 21 Otsutomocho, Kanazawa-ku; and Takeshi Inoi, 44 Otsutomocho, Kanazawa-shi, both of Yokohama-shi, Japan; Kenjiro Shoji, 538 Yukinoshita, Kamakura-shi, Japan; and Motoyoshi Matsunaga and Hitoshi Kato, both % Moriyama Plant % Chisso Acetate K.K., 515 Kojima, Moriyamacho, Yasu-gun, Shiga-ken, Japan
Filed Nov. 28, 1966, Ser. No. 597,333
Claims priority, application Japan, Nov. 26, 1965, 40/72,629
Int. Cl. A61l *13/00*
U.S. Cl. 424—251                4 Claims

ABSTRACT OF THE DISCLOSURE

A composition of one *or* more chlorides of 2,7-dioxo-4,5-dimethyl-decahydropyrimido[4,5-d]pyrimidine, its isomer or mixtures thereof, wherein each ingredient contains one to four active chlorines, and the use of such compositions as germicides, bleaching agents, oxidants, and the like.

---

Figure 1:
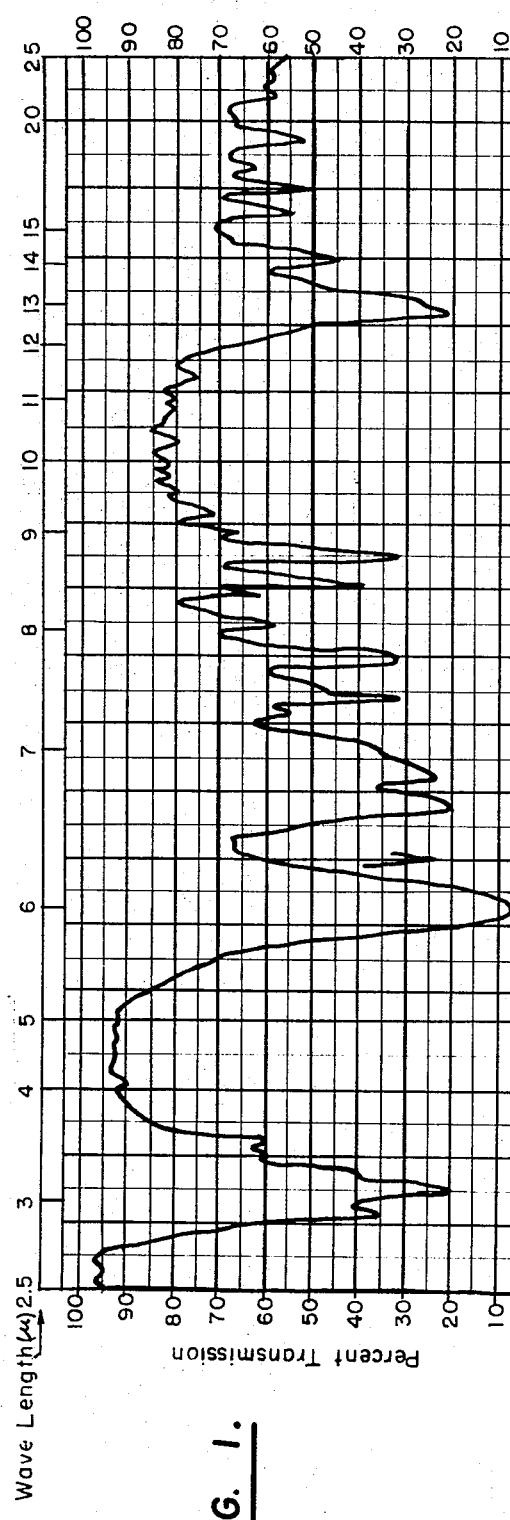

The present invention relates to a composition of one or more chlorides of 2.7-dioxo-4.5-dimethyl-decahydropyrimido[4,5-d]pyrimidine (which will be abbreviated to as "PP" hereinafter), its isomer (which will be abbreviated to "CB" hereinafter) or a mixture of PP and CB, each ingredient of which contains one to four active chlorines, and to the application of said composition to germicide, bleaching agent, oxidant or the like.

PP can be produced directly by reacting acetaldehyde with urea, or by reacting 2-oxo-4-methyl-6-ureido hexahydro pyrimidine produced from acetaldehyde and urea further with acetaldehyde. (Zigeuner et al, Monatshefte für chemie, vol 92, p. 40). As a commercially useful method for producing PP, the pending Japanese patent application No. 53,262/1965 of the present applicant discloses the method in which PP is produced by reacting 2-oxo-4-methyl-6-ureido-hexahydropyrimidine with acetaldehyde in a molar ratio of 1:0.3 to 1:1.5, in a dispersion medium of water or a mixture of water and an organic solvent, in the presence of a mineral organic acid as catalyst and in the pH range of the reaction system of 0.5 to 3.0.

On the other hand, CB is obtained simultaneously in the production of 2-oxo-4-methyl-6-ureido hexahydropyrimidine, the method of which was discovered by the present applicant (Japanese patent publication No. 28,338/1964). In this production method, the filtrate obtained by filtering the reaction product of acetaldehyde with urea is cooled or allowed to stand, and then CB is obtained from the filtrate in a crystalline state.

CB is also obtained in the production of PP by reacting, for example, more than three mols of acetaldehyde with two mols of urea at about 50° C. for about 4 hours in an acidic state. In this production method, the filtrate obtained by filtering the product is cooled to about $-15°$ C., and then CB is obtained from the filtrate in a crystalline state.

CB is a novel compound which has never been disclosed, the molecular formulas, structural formulas and physical properties of PP and CB are shown in the following table.

|  | PP | CB |
|---|---|---|
| Molecular formula | $C_8H_{14}N_4O_2 \cdot 2H_2O$ | $C_8H_{14}N_4O_2 \cdot H_2O$ |
| Structural formula | (structure) $\cdot 2H_2O$ | (structure) $\cdot H_2O$ |
| M.P. (decomposed almost simultaneously with melting). | 291–293° C. | 292–293° C. |
| Solubility in water: |  |  |
| 30° C |  | 2.9. |
| 50° C | 0.8 | 7.4. |
| 60° C |  | 13.8. |
| 70° C | 1.8 |  |
| Infrared spectrum | Figure 1 appended | Figure 3 appended. |

NOTE.—Water of crystallization of PP and CB is easily removed on heating.

As seen in the above table, the molecular formula of CB is $C_8H_{14}N_4O_2 \cdot H_2O$ and has the same elemental analysis ($C_8H_{14}N_4O_2$) with with that of PP, excepting that water of crystallization per mole is different. CB is also different from PP in solubility in water.

The above-mentioned structural formula of PP has four unsymmetrical carbon atoms. From such a structure, the presence of various isomers is expected. CB, i.e., an isomer of PP, may be considered as a diastereoisomer.

Any chloride of PP, CB or a mixture of PP and CB has never been disclosed. The present inventors have found that these chlorides have one to four active chlorines and are useful as bleaching agent, germicide, oxidant or the like.

Heretofore, sodium hypochlorite has been known as the most common compound containing active chlorine. However, since it is stable only in a relatively dilute solution and has to be used in a large amount, the use of it is extremely inconvenient.

Beside hydrochlorite, the following active chlorine-containing organic compounds have been known; chlorinated amide or imide such as N-chloro acetamide, N-monochloro urea, N-chloro succinic acide imide, chloro sulfamic acid, N-chloro-5,5-dimethyl hydantoin or the like, chlorinated cyanuric acid or the like. However, all of them are so unstable and so expensive that the manufacture and the use thereof are not commercially attractive.

An object of the present invention is to provide a composition having an excellent preservability and bleaching, germicidal and oxidative properties and others.

Another object is to provide a method for producing said composition in a better yield. Further object is to provide a method for applying said composition to bleaching agent, germicide, oxidant or the like.

The chlorides can be obtained preferably by suspending PP, CB or a mixture thereof in an alkaline aqueous solution having a pH below 13, and passing chlorine gas with stirring through the resultant suspension maintained at a temperature below 30° C.

The chlorination proceeds in such a way as to allow chlorine atoms substitute for hydrogen atoms of NH radicals or other reactive hydrogen atoms in PP or CB i.e. to produce one molecule of hydrogen chloride per one chlorine atom. Accordingly, the chlorination can be promoted and adjusted by the presence of an acceptor of the hydrogen chloride formed. As such acceptors of hydrogen chloride, alkali compounds are preferable. Among them, those are most preferable which have a relatively less tendency to react with chlorine gas, and do not hinder the reaction of PP or CB with chlorine and do not promote hydrolysis of the chlorination product. Examples of such alkali compounds are sodium carbonate, sodium bicarbonate, potassium carbonate and potassium bicarbonate, having a pH below 13 in a solvent. The chlorine contents of the chlorides can be adjusted by the amount of the alkali compounds to be used. For example, when the chlorination is carried out by using the alkali compounds in an amount of more than four equivalents per one mole of PP or CB, the compounds containing four chlorine atoms in one mole of PP or CB can be obtained. Also, as the amount of alkali compounds used is reduced to less than four equivalents per one mole of PP or, CB the compounds containing less than four chlorine atoms can be obtained. Thus the chlorides containing one to four active chlorine atoms in one mole of PP or CB can be obtained.

The compositions of the present invention include also mixtures of any of mono-, di-, tri- or tetrachloride.

Even if alkali compound is not used, the compound which is chlorinated to some extent (at most 5%) may be obtained. However, from such a product, the effectiveness of active chlorine cannot be expected so much.

The chlorination temperature in the preparation of the chlorides of the present invention is below 30° C., preferably in the range of 0 to 10° C., because when it exceeds 30° C., the ratio of the chlrorine used ineffectively to the active one increases, and when it is too low to maintain a liquid state, the chlorination becomes practically impossible. Since the concentration of hydrogen ion in the solution decreases in accordance with introduction of chlorine gas, the progress of the reaction can be caught by tracing of the concentration. The reaction completes at pH of about 5, and then the charge of chlorine gas is stopped. Though there is no particular limitation to the velocity and period of introduction of chlorine gas, it is preferable from the standpoint of uniformity and efficiency of chlorination that the gas is gradually introduced over one to 3 hours.

There is no particular limitation to a solvent to be used so long as it is capable of dispersing PP or CB and dissolving the alkali compounds. Water, methanol or a mixture thereof is preferably used as such a solvent.

PP and CB to be chlorinated contain normally water of crystallization, but it is indifferent to the chlorination.

The chlorides can be obtained in a high purity by washing and air-drying the reaction product and purified further by recrystallization from a solvent such as chloroform. The yields of the chlorides are nearly quantitative.

Figure 2:
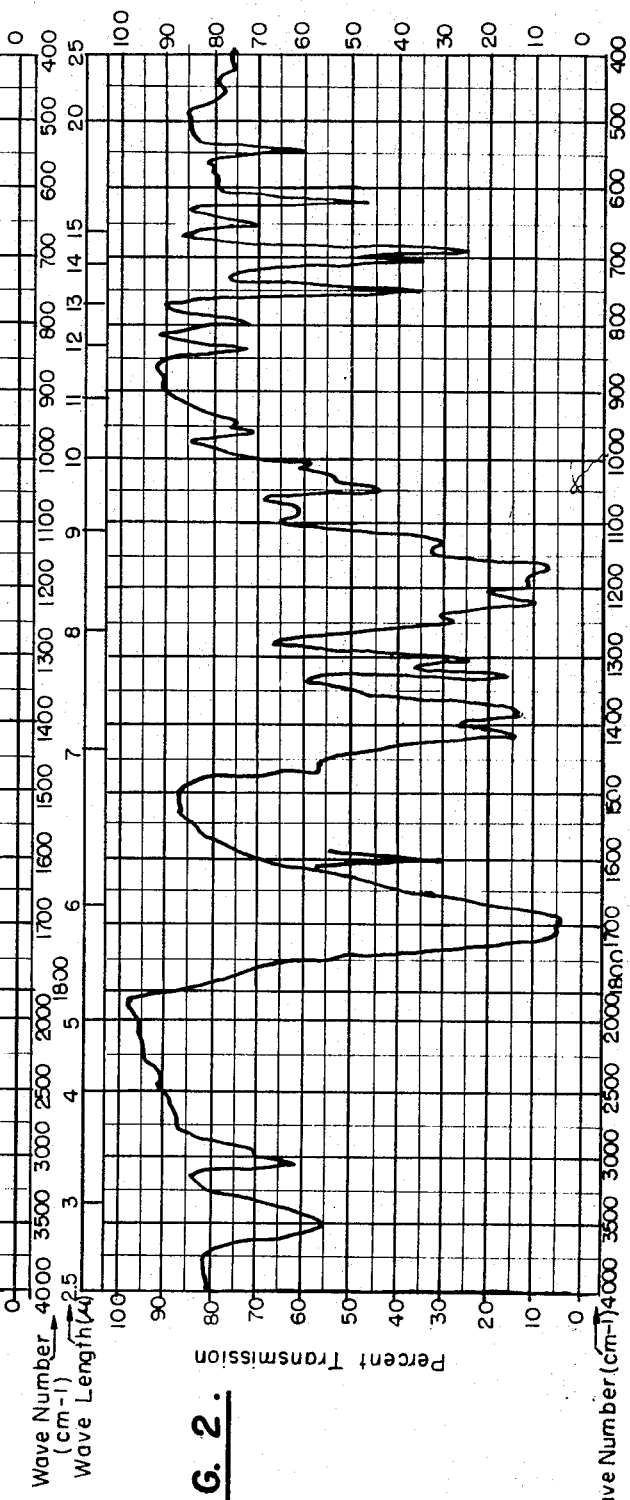

FIG. 1 which accompanies and forms a part of the specification shows the infrared spectrum of 2.7-dioxo-4.5-dimethyl-decahydropyrimido[4,5-d]pyrimidine, and FIG. 2 shows the infrared spectrum of the compound in which about four chlorine atoms are substituted for hydrogen of NH in the compound of FIG. 1. FIG. 3 shows the infrared spectrum of the isomer of 2.7-dioxo-4.5-dimethyl-decahydropyrimido[4.5-d]pyrimidine and FIG. 4 shows the infrared spectrum of the compound in which about three chlorine atoms are substituted for the hydrogen of NH in the isomer of FIG. 3.

When the active chlorine-containing compositions of the present invention are used for the purposes of bleaching, sterilization, oxidation or the like, any compound containing one to four chlorine atoms in the molecule or mixture thereof may be applied solely and if necessary in the presence of a dispensing agent and/or other agents.

The compositions of the present invention are suitable to various kinds of application which requires the action of active chlorine, such as bleaching, sterilization, oxidation or the like. More comprehensive explanation as to each case of application will be given.

In the first place, the chlorides are used alone as bleaching agent. The compositions may be applied to the bleaching of various substances, but the bleaching of fibrous materials is most important. In bleaching fibrous materials, it has been found that the compositions have such an advantage that they attack fibrous materials uniformly and very moderately over a long period without affording any harmful effect upon the fibrous materials.

It is a further advantage of the present compositions that abrupt evolution of harmful and stinging chlorine gas can be avoided in the bleaching process and there is no problem of corrosion of apparatus.

The fibrous materials to be used in the bleaching by the present composition include natural, semi-synthetic and synthetic fibrous materials, fiber-forming materials, such as pulp, cotton, flax, silk, wool, rayon, cellulose acetate, materials composed of higher molecular chain substances such as polyesters, polyamides, polyacrylonitrile, polyvinyl formal, polyolefins such as polypropylene, polyvinylidene chloride etc. and all kinds of products made from the above-mentioned fibrous materials.

The bleaching of the above-mentioned fibrous materials is carried out by dipping the materials in an aqueous liquor containing chlorides of PP, CB or a mixture thereof.

The chlorides dissolve in water very slowly and undergo hydrolysis to form hypochlorous acid having bleaching effect. When the chlorides are used in an amount less than equivalent relative to their solubility in water at saturation, a better bleaching effect can be obtained at a relatively low pH, such as 2. On the other hand, when the chlorides are used in a large amount more than equivalent to the solubility in water at saturation, a better bleaching effect can be obtained at a relatively high pH as 12. In this case, a higher pH results in a better solubility of the chlorides, shortening their bleaching period and improving their bleaching effect. Even at a lower pH, the solubility of the chlorides is improved by elevating the liquid temperature, preferably to 70 to 100° C.

Though the addition amount of the chlorides may vary according to the changes of pH and temperature of liquor, 0.01 to 1% by weight relative to water may generally suffice. The period of treatment is suitably to be one to 20 hours.

The foregoing description is directed to the case in which the chlorides of PP or CB are applied alone in a medium of water. It has been found that when one or more additives such as compounds of phosphoric acid and condensed phosphoric acids, surfactants, compounds of silver, compounds of mercury, silicates and neutral salts of alkali is added to the bleaching liquor of the present invention, the loss of available chlorine is reduced and the bleaching effect can be improved in a shorter time.

Examples of the above-mentioned compounds of phosphoric acid and condensed phosphoric acids include a salt of phosphoric acid or condensed phosphoric acids such as sodium or potassium salt of phosphoric acid, metaphosphoric acid, pyrophosphoric acid tripoly phosphoric acid or the like.

The useful surfactant may be a cationic, anionic or nonionic one, but a nonionic one such as Scourol #900 (made by Kao Soap Co.), Alkamin (made by Maruzen Oil Co.), Sanmol #120 (made by Nikka Kagaku Co.), Noigen SS (made by Daiichi Kogyo Seiyaku Co.) or the like is preferable. Examples of the useful compounds of silver are silver nitrate, silver phosphate, silver oxide, silver carbonate etc. Examples of the useful compounds of mercury are mercury sulfate, mercury nitrate etc. Examples of the useful silicates are potassium silicate, sodium silicate etc. And examples of the useful neutral salts of alkali are potassium sulfate, sodium sulfate etc. Water is a preferable liquid medium for the preparation of the bleaching liquid.

Though there is no particular limitation to the amount of the chlorides of PP, CB or a mixture thereof to be used, about one percent by weight to the liquid may suffice.

As for the amount of the additives used such as the compound of phosphoric acid system and others, 0.001 to 5% by weight to the liquid may suffice, but about 0.01 to 2% may be preferable. Though there is no particular limitation, the temperature above room temperature, particularly 70 to 80° C. may be preferable in the treatment. As the period, 0.5 to 2 hours, usually about one hour, will be sufficient.

In the use of the additives, a better result can be obtained by carrying out the bleaching in the presence of an alkaline compound capable of increasing the solubility of the chlorides of PP, CB or a mixture thereof and accordingly capable of aiding the release of active chlorine, such as sodium hydroxide, sodium carbonate, sodium bicarbonate, potassium hydroxide, potassium carbonate, potassium becarbonate, calcium carbonate or the like.

Next, the case in which the chlorides of PP, CB or a mixture thereof are applied to sterilization will be described.

Heretofore, bleaching powder has been used in the sterilization of various kinds of matters and places. For example, water which needs sterilization such as river water, industrial waste water, city water, sewage, swimming pool, public bath or the like, places to be visted by many people such as amusement place, hotel, barber or the like, places to be scavenged such as stall, grave yard, slaughter-house or the like, and things to be disinfected such as clothes, tools, instruments, tablewares, filth or the like.

The germicidal action of bleaching powder is caused by hypochlorous acid which is generated in the reaction of bleaching powder with water (from air or other sources) present in the place where the powder is applied. Since this reaction is relatively rapid, it has such a disadvantage that its activity suddenly falls with the generation of stinging smell.

Above all, in the sterilization of water, the active portion of bleaching powder has such a high solubility in water that its activity quickly falls, for example, on account of the loss in flowing water. When it is used in public bath, its application must be repeated very often, say, every two hours, because hypochlorous acid generated is rapidly lost on dissolving. Moreover it is unbearable disadvantage of the bleaching powder that it emits a stinging smell and in actual application, it must be mixed with a large amount of water in order to obtain a supernatant liquid to be used.

As the germicide for drinking water including simple service water, the following compounds have been used but they are so expensive and the amount to be used must be limited;

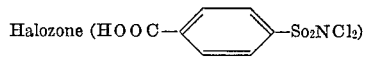

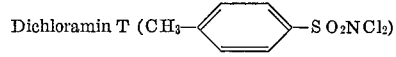

Accordingly, there has been long waited for a germicide which is inexpensive, keeps a slow-releasing, long acting activity and brings about a sufficiently germicidal effect even in a small amount.

In such a situation, it has been now found that the chloride composition of the present invention satisfies the above-mentioned demands for germicide and can be applied to the above-mentioned various matters and places, preferably to water to be sterilized or to water to be used for sterilization.

When the chlorides of the present invention are brought into contact with water, they are slowly hydrolyzed to generate hypochlorous acid, which displays a powerful germicidal effect for a long period.

For the application of the present chlorides to germicide, various methods can be adopted. The chlorides are added directly to water to be sterilized, or bags filled with them are put into water. Or, they can be scattered in bulk directly over the above-mentioned matters or places to be sterilized. Or, they are used after mixed with another compounding agent such as a detergent, or after shaped in a solid form, or after dissolved in a suitable organic solvent such as chloroform, dichloromethane, acetone or the like. For instance, when tablewares used at hotel, hospital, restaurant, dairy farm, home or the like are to be washed (usually at 60 to 80° C.), the addition of a little amount of the chlorides of the present invention to a cleanser brings about a sufficient sterilizing effect along with washing.

When the chlorides are used for sterilization of water, uniform and long-lasting effect can be obtained even in a small amount, because they have a low solubility in water and the speeds of dissolving the hydrolysis are very slow. For example, the tetrachloride of CB is added with stirring to 100 cc. of water at 20° C. in various amounts and the dissolved amount is measured as follows.

| Added amount (g.) | 10 | 5 | 1 | 0.1 | 0.01 |
|---|---|---|---|---|---|
| Dissolved amount (p.p.m.) | 800 | 640 | 320 | 200 | 50-60 |

This tendency holds also in the case of the chloride of PP. It is preferable to keep the amount dissolved in water usually above 50 p.p.m. For such purpose, the chlorides of PP, CB or a mixture thereof are added in an amount of more than 0.01% relative to water. In this case, however, it takes a relatively long period (about one hour) in order to make the dissolved amount reach a desired value. Accordingly, it is preferable in the practical operation that a large amount of the chlorides (for example, more than 1% to water) is placed in water, to increase the dissolved amount, to shorten the period necessary to obtain a proper concentration for sterilization, and to improve the sterilizing effect. Besides, the chlorides are dissolved and hydrolyzed so little by little that the sterilizing effect is released uniformly and for a long period, and therefore the chlorides need not be added so often as in the case of bleeching powder. Moreover, there is no such a stinging smell as in the case of the powder.

In the sterilization the chlorides of PP, CB or a mixture thereof containing one to four chlorine atoms in their constituent molecule can be used but those containing three and four chlorine atoms are most effective.

The properties of the compounds containing four chlorine atoms are as follows:

|  | Tetra-chloride of PP | Tetra-chloride of CB |
|---|---|---|
| Available chlorine, percent | *84.3 | *84.0 |
| M.P., ° C. (decomposed almost simultaneously with melting) | *140 | *171 |
| Solubility in water, percent | *<0.02 | *<0.02 |

* Recrystallizable from chloroform.

When these chlorides were stirred in water for a long period, for example, 4 hours and filtered, the result of analysis proved that the residue was still tetrachloride. This result shows that these tetrachloride remaining in a solid state in water are very stable. Moreover, the resultant filtrates were in a completely sterilized state. Also, there was no appreciable bad smell observed throughout the process.

As mentioned above, the compositions of the present invention can be applied extensively to oxidation of various substances, preferably of organic substances. Particularly, since their action is mild in oxidation of organic substances, they can be used effectively even in the case in which any other oxidant is not suitable.

The following examples are illustrative. However, the present invention is not limited to these examples.

Examples of preparing the compositions comprising the chlorides of PP or CB.

EXAMPLE 1

45.5 g. of PP and a solution of 8.8 g. of sodium carbonate dissolved in 700 cc. of water were introduced into a 2 l. round-bottom, three-necked flask and a liquid suspension of PP was thus prepared. Chlorine gas was passed through the liquid under stirring while it was kept at 0 to 3° C. with ice-cooling. The initial pH was 12.5. As chlorine gas was passed, it lowered, reaching about pH 5 after two hours, when introduction of chlorine gas was stopped and then the reaction liquid was filtered. A solid product thus obtained was washed with cold water, dried and recrystallized from chloroform. 63.5 g. of the crystal was obtained. Yield: 97.2%.

The analytical values of elements and properties of the crystal were as follows:

|  | C | H | N | G |
|---|---|---|---|---|
| Analytical values of elements for the crystal, percent | 28.8 | 3.2 | 16.4 | 42.5 |
| Theoretical values of elements for the compound derived by the substitution of Cl for H of four NH radicals of PP, percent | 28.6 | 3.0 | 16.7 | 42.2 |

Melting point: 140° C. (decomposed almost simultaneously with melting).

Such a sharp melting point as 140° C. indicates that the obtained material is a pure compound, and the result of the analytical values of elements indicates that it is a compound derived by the substitution of Cl for H of four NH radicals of PP, that is, 1·3·6·8-tetrachloro-2.7-dioxo-4.5-dimethyl decahydropyrimido [4.5-d] pyrimidine. Its infrared spectrum is that of FIG. 2. It has been found that compared with the spectrum of PP of FIG. 1, it has neither the absorption based upon the stretching vibration of NH in 3300 to 3500 (wave number) and the absorption based upon the deformation vibration of NH in 1450 to 1550 (wave number). This means that the NH radicals of PP were chlorinated and converted into NCl radicals.

The kind and amount of alkali to be used were varied. The results are described in the following table of Examples 2 to 4.

EXAMPLES 2 TO 4

|  | PP (g.) | Water (cc.) | Alkali agent (g.) | pH Initial | pH Final | Temperature (° C.) | Yield (g.) | Efficiency (percent) | Analytical value of chlorine of the chlorides (percent) | Melting point (° C.)₁ |
|---|---|---|---|---|---|---|---|---|---|---|
| Example 2 | 23.4 | 200 | K₂CO₃, 34.5 | 12.5 | 5.5 | 0–3 | 33.0 | 98.2 | 42.5 | 140 |
| Example 3 | 23.4 | 200 | NaHCO₃, 42 | 8.9 | 4.5 | 3–6 | 32.5 | 96.7 | 42.5 | 140 |
| Example 4 | 23.4 | 200 | Na₂CO₃, 10.6 | 12.3 | 2.5 | 0–3 | 20 | 71 | 17.3 | 98–105 |

¹ Decomposed almost simultaneously with melting.
NOTE.—In Example 2, several drops of methanol were added to the suspension liquid to suppress bubbling. The lower efficiency in Example 4 may be considered to be caused from the operation in which the introduction of chlorine gas was continued until the pH lowered to 2.5, whereby the solubility of the formed chlorides increased so that a considerable amount of the chlorides was dissolved out into the filtrate solution.

Judging from the fact that the infrared spectra of the products obtained in Examples 2 and 3 are the same as the spectrum of FIG. 2, the products may be considered to be tetrachloride of PP. The product obtained in Example 4 of which the analytical value of chlorine is 17.3%, may be considered to be a mixture consisting of a compound derived from chlorination of one NH radical of PP, as a main constituent and a small amount of a compound derived from chlorination of two NH radicals of PP, since the theoretical value of chlorine of a compound to be derived from chlorination of two NH radicals of PP is 26.6% and that of one NH radical of PP is 15.5%.

This is also evidenced by the fact that a considerable amount of the absorption of NH radical remained in the infrared spectrum of the product (its figure is not appended). The product could be recrystallized from chloroform.

EXAMPLE 5

9.9 g. of CB and a solution of 8.2 g. of sodium carbonate dissolved in 120 cc. of water were introduced into a 2 l. round-bottom, three-necked flask and a liquid suspension of CB was thus prepared. Chlorine gas was passed through the liquid under stirring while it was kept at 3 to 6° C. with ice-cooling. The initial pH was 12.8 As chlorine gas was passed, it lowered, reaching pH 5.6 after one and a half hours, when introduction of chlorine gas was stopped and then the reaction liquid was filtered. The resultant product was insoluble in chloroform.

Yield: 14.2 g. (efficiency: 93%)

M.P.: 131–134° C. (decomposed almost simultaneously with melting).

Analytical value of chlorine: 35.6%

The infrared spectrum of the product is shown in FIG. 4. As seen in the specturm, the absorption based upon the stretching vibration of NH in about 3300 (wave number) and the absorption based upon the deformation vibration in 1450 to 1550 (wave number) which are observed in the infrared spectrum of CB (FIG. 3 appended), are considerably weak. From the fact, it can be understood that a considerable amount of NH radical which is estimated to be present in CB was converted into NCl. Furthermore, from the fact that the melting point of the product is not sharp and the analytical value of chlorine is 35.6%, it can be considered that the product is a mixture of chlorides consisting mainly of the chloride derived from introduction of three chlorine atoms (the theoretical value of which is 35.6%).

In the chlorination of CB, the kind and amount of alkali to be used were varied. The results are described in the above Examples 6 to 9.

The products obtained in Examples 6 and 7 showed the same infrared spectum as that of the product obtained in Example 5. The product obtained in Example 8 of which the analytical value of chlorine was 24.0%, can be considered to be a mixture consisting of the compound, as a main constituent, derived from introduction of two chlorine atoms into CB and a small amount of a compound derived from introduction of one chlorine atom, since the theoretical value of chlorine of the chloride of CB to be derived from introduction of two chlorine atoms is 26.6% and that of one chlorine atom is 15.5%. The product obtained in Example 9 can be considered to be tetrachloride of CB, since the analytical value of chlorine of the product which is 42.2%, agrees with the theoretical value of chlorine of the tetrachloride.

Examples of bleaching fibrous materials using the compositions comprising the chlorides of PP or CB.

The bleaching effects in the following examples are expressed by the yellowness of the Hunter method. The yellowness is calculated using the following formula, $$\frac{A/0.8 - B/1.18}{G}$$

wherein:

G: the reflection rate of the sample in the case of that of MgO being 100,
A: the reflection rate of the sample in the case of that of MgO being 80,
B: the reflection rate of the sample in the case of that of MgO being 118.

The reflection rates were measured by means of the spectrophotometer SEP-H (manufactured by Nippon Seimitsu Kōgaku Co.). The smaller value of yellowness means higher whiteness of the sample.

EXAMPLE 10

Various amounts of the tetrachloride of PP obtained in Examples 1 to 3 were added to 16.8 g. of water. Bleaching was carried out by dipping into the resultant mixtures 0.84 g. of each of the following materials: desized, unbleached cotton cloth, unbleached rayon cloth, unbleached cellulose acetate cloth, unbleached linen, unbleached pulp, and synthetic fiber cloth.

EXAMPLES 6 TO 9

| | CB (g.) | Water (cc.) | Alkali agent (g.) | pH Initial | pH Final | Temperature (° C.) | Yield (g.) | Efficiency (percent) | Analytical value of the chlorides (percent) | Melting point (° C.) [1] |
|---|---|---|---|---|---|---|---|---|---|---|
| Example 6 | 21.6 | 400 | $K_2CO_3$, 55.2 | 12.5 | 5 | 3–6 | 31.3 | 94.4 | 34.9 | 130–4 |
| Example 7 | 21.6 | 400 | $NaHCO_3$, 33.6 | 9.5 | 5 | 3–6 | 30.5 | 92 | 35.2 | 131–4 |
| Example 8 | 9.9 | 120 | $Na_2CO_3$, 3.8 | 8.9 | 5 | 3–6 | 11.5 | 88.4 | 24.0 | 100–110 |
| Example 9 | 21.6 | 200 | $K_2CO_3$, 60 | 12.5 | 7 | 3–6 | 32.5 | 96.7 | 42.2 | 170–171 |

[1] Decomposed almost simultaneously with melting.

The treating conditions and the results were as follows:

| Materials and experimental No. | Amount of chlorinated PP (g.) | pH | Temperature (° C.) | Period (hr.) | Yellowness |
|---|---|---|---|---|---|
| Unbleached cotton cloth: | | | | | |
| 1 | 0 | 7 | 80 | 3 | 0.192 |
| 2 | 0.0156 | 7 | 80 | 3 | 0.142 |
| 3 | 0.0156 | 7 | 100 | 2 | 0.144 |
| 4 | 0 | 2 | 100 | 2 | 0.203 |
| 5 | 0.0156 | 2 | 100 | 2 | 0.133 |
| 6 | 0.0156 | 9 | 100 | 2 | 0.186 |
| 7 | 0.0084 | 2 | 100 | 2 | 0.164 |
| 8 | 0.0168 | 2 | 100 | 2 | 0.134 |
| 9 | 0.0252 | 2 | 100 | 2 | 0.113 |
| 10 | 0.042 | 2 | 100 | 2 | 0.106 |
| 11 | 0.168 | 2 | 100 | 2 | 0.111 |
| Unbleached rayon cloth: | | | | | |
| 12 | 0 | 2 | 100 | 2 | 0.188 |
| 13 | 0.0084 | 2 | 100 | 2 | 0.156 |
| 14 | 0.0252 | 2 | 100 | 2 | 0.102 |
| Unbleached cellulose acetate cloth: | | | | | |
| 15 | 0 | 2 | 100 | 2 | 0.127 |
| 16 | 0.0084 | 2 | 100 | 2 | 0.098 |
| 17 | 0.0252 | 2 | 100 | 2 | 0.052 |
| Unbleached linen: | | | | | |
| 18 | 0 | 2 | 100 | 2 | 0.471 |
| 19 | 0.0156 | 2 | 100 | 2 | 0.236 |
| 20 | 0.042 | 2 | 100 | 2 | 0.185 |
| Polyethyleneterephthalate cloth: | | | | | |
| 21 | 0 | 2 | 100 | 2 | 0.135 |
| 22 | 0.042 | 2 | 100 | 2 | 0.082 |
| Nylon cloth: | | | | | |
| 23 | 0 | 2 | 100 | 2 | 0.124 |
| 24 | 0.042 | 2 | 100 | 2 | 0.074 |
| Polypropylene cloth: | | | | | |
| 25 | 0 | 2 | 100 | 2 | 0.115 |
| 26 | 0.042 | 2 | 100 | 2 | 0.090 |

Bleaching test of unbleached pulp was also carried out. The pulp was evidently whitened by using chloride of PP of the present invention, though the measurement was not carried out.

EXAMPLE 11

Bleaching was carried out in the same way as in Example 10, excepting that the trichloride of CB obtained in Examples 5 to 7 was used in place of the tetrachloride of PP. The treating conditions and the results were as follows.

The pH, temperature and period are 2, 100° C. and 2 hours, respectively throughout these cases.

| Materials and experimental No. | Amount of chlorinated PP (g.) | Yellowness |
|---|---|---|
| Unbleached cotton cloth: | | |
| 1 | 0 | 0.211 |
| 2 | 0.0089 | 0.146 |
| 3 | 0.0177 | 0.131 |
| 4 | 0.0267 | 0.114 |
| 5 | 0.0445 | 0.094 |
| 6 | 0.0890 | 0.093 |
| Unbleached rayon cloth: | | |
| 7 | 0 | 0.188 |
| 8 | 0.0089 | 0.149 |
| 9 | 0.0267 | 0.110 |
| Unbleached cellulose acetate cloth: | | |
| 10 | 0 | 0.127 |
| 11 | 0.0089 | 0.087 |
| 12 | 0.0267 | 0.049 |
| Unbleached linen: | | |
| 13 | 0 | 0.476 |
| 14 | 0.0156 | 0.235 |
| 15 | 0.042 | 0.192 |
| Polyethylene terephthalate cloth: | | |
| 16 | 0 | 0.140 |
| 17 | 0.042 | 0.088 |
| Nylon cloth: | | |
| 18 | 0 | 0.131 |
| 19 | 0.042 | 0.082 |
| Polypropylene cloth: | | |
| 20 | 0 | 0.122 |
| 21 | 0.042 | 0.095 |

Bleaching test of unbleached pulp also was carried out. The pulp became evidently white, though it was not measured.

EXAMPLE 12

Bleaching effects were measured regarding the cases in which a large amount of the chlorides i.e. in excess of its solubility in water were used and pH of the liquor was varied.

2 g. of unbleached cotton cloth which was scoured with a solution of Monogen (2 g./l.) at 75 to 80° C. for one hour, was dipped for one hour in 80 cc. of water at 75 to 80° C. containing 0.8 g. of the tetrachloride of PP or CB in suspension state.

The initial pH of the both was adjusted to 2, 5 (adjusted with acetic acid), 8, 10 or 12 (adjusted with sodium hydroxide).

The results were as follows:

| Experimental No. | Unbleached cotton cloth | pH | Yellowness | |
|---|---|---|---|---|
| 1 | Original | | 0.205 | |
| 2 | Scoured | | 0.192 | |
| | | | With tetrachloride of PP | With tetrachloride of CB |
| 3 | Scoured | 2 | 0.141 | 0.150 |
| 4 | do | 5 | 0.157 | 0.167 |
| 5 | do | 8 | 0.128 | 0.126 |
| 6 | do | 10 | 0.124 | 0.130 |
| 7 | do | 12 | 0.125 | 0.125 |

As seen in the above table, it can be seen that when a large amount of the chlorides in excess of its solubility in water is used, there is such a tendency that the bleaching effect is improved in accordance with the increase of pH.

EXAMPLE 13

This example shows a low temperature (room temperature) treatment.

2 g. of unbleached cotton cloth scoured in the same way as in Example 12 was dipped for 16 hours in 80 cc. of water at 15 to 20° C. containing 2.4 g. of the tetrachloride of PP or CB in suspension state.

The initial pH of the bath was adjusted to 10 with sodium hydroxide. The results were as follows:

| Unbleached cotton cloth | Yellowstone | |
|---|---|---|
| Original | 0.205 | |
| Scoured | 0.192 | |
| | With tetrachloride of PP | With tetrachloride of CB |
| Scoured | 0.138 | 0.140 |

As seen in the above table, the bleaching effects were sufficient.

Examples of bleaching fibrous materials using compositions comprising the chlorides of PP or CB, wherein additives were applied.

The measurements of whiteness in the following examples were caried out according to the testing method of whiteness of JIS–1074[1] (Judd Method), wherein characteristic curves of spectro-reffection rates were obtained by measuring the reflection rates of samples to standard white sheet in the range of visible ray (400 to 700 m$\mu$) by means of the self-recording spectrophotometer manufactured by Hitachi Seisakusho Co.

[1] JIS Japanese Industrial Standard.

EXAMPLE 14

400 g. of a liquid a suspension containing 4 g. of the tetrachloride of PP and 0.2 g. of each of the following surfactants was prepared. Similarly, a liquid suspension containing the tetrachloride of CB was prepared. Bleaching of 10 g. of cotton yarn (whiteness 0.620) was carried out using the two kinds of liquid.

Liquor ratio—1:40
Temperature—75 to 80° C.
Period—60 minutes

After the treatment, dechlorination was carried out at 70° C. for 30 minutes with a solution of $NaHSO_3$ (2 g./l.). The results were as follows:

| | Surfactant | | | Whiteness | |
|---|---|---|---|---|---|
| Experimental No. | Trade name | Name of maker | Ionic property | With tetrachloride of PP | With tetrachloride of CB |
| 1 | Not used | | | 0.714 | 0.716 |
| 2 | Monogen | Daiichi Kogyo Seiyaku | Anionic | 0.800 | 0.802 |
| 3 | Hitex NA | Miyoshi Yushi | Nonionic | 0.821 | 0.810 |
| 4 | Scourol #900 | Kao soap | do | 0.835 | 0.830 |
| 5 | Neoplex paste | do | Anionic | 0.815 | 0.827 |
| 6 | Teepol 515 | Daiichi Kogyo Seiyaku | do | 0.807 | 0.815 |
| 7 | Supara B | Chiyoda Kagaku | Mixture of nonionic, anionic and inorganic surfactant. | 0.825 | 0.820 |
| 8 | Sanmol #120 | Nikka Kagaku | Nonionic | 0.825 | 0.828 |
| 9 | Noigen HC | Daiichi Kogyo Seiyaku | do | 0.817 | 0.813 |
| 10 | Noigen SS | do | do | 0.827 | 0.828 |
| 11 | Neutron NJT | Nissin Kagaku | do | 0.815 | 0.820 |
| 12 | Neutron DLT | do | Nonionic | 0.798 | 0.790 |
| 13 | Sanmol NP | Nikka Kagaku | do | 0.827 | 0.825 |
| 14 | Alkamin C-201 | Maruzen Yushi | do | 0.829 | 0.828 |
| 15 | Supara A soft | Chiyoda Kagaku | Mixture of nonionic and anionic surfactant. | 0.818 | 0.820 |

EXAMPLE 15

Unbleached cotton yarn (whiteness 0.620) was bleached in the same way as in Example 14, excepting that phosphoric agent, silver agent, mercury nitrate, sodium silicate and sodium sulfate were used as additive in place of the surfactants in Example 14. The results are shown in the following table. The amount of available chlorine in the use of the tetrachloride of PP and that in the use of the tetrachloride of CB in the table mean the amount of available chlorine in the filtrate which was measured after the bleaching bath was stirred under the bleaching condition, that is, at 75 to 80° C., for one hour, without incorporating unbleached cotton yarn therein. As seen in the table, it can be understood that the amount of available chlorine increases remarkably with addition of the additives.

| | | Whiteness | | Amount of available chlorine | |
|---|---|---|---|---|---|
| | | In the use of tetrachloride of PP | In the use of tetrachloride of CB | In the use of tetrachloride of PP (mg.) | In the use of tetrachloride of CB (mg.) |
| Experimental No. | Additive (g.) | | | | |
| 16 | | 0.714 | 0.716 | 1,715 | 1,723 |
| 17 | $Na_3PO_4$, 0.5 | 0.831 | 0.832 | 2,350 | 2,430 |
| 18 | $Na_3PO_4$, 1.0 | 0.840 | 0.836 | 2,775 | 2,730 |
| 19 | $Na_5P_3O_{10}$, 1.0 | 0.841 | 0.842 | 2,880 | 2,910 |
| 20 | $Na_5P_3O_{10}$, 2.0 | 0.837 | 0.832 | 3,150 | 3,090 |
| 21 | $Ag_3PO_4$, 0.5 | 0.810 | 0.809 | 2,013 | 2,025 |
| 22 | $Ag_2CO_3$, 0.5 | 0.772 | 0.795 | 1,958 | 1,940 |
| 23 | $Hg(NO_3)_2$, 0.5 | 0.808 | 0.801 | 1,980 | 1,975 |
| 24 | $Na_2SiO_3$, 0.5 | 0.810 | 0.810 | 2,100 | 2,095 |
| 25 | $Na_2SO_4$, 0.5 | 0.812 | 0.813 | 2,185 | 2,232 |

[1] Theoretical content: 3,200.
[2] Theoretical content: 3,192.

EXAMPLE 16

Bleaching liquors were prepared by incorporating, together with 0.2 g. of Scourol #900, the tetorachloride of PP or CB in such amounts that the contents of the chloride corresponded to the amounts described in the following table, and adjusting the pH's to 10 with sodium carbonate. 10 g. of unbleached cotton yarn (whiteness 0.620) was treated with the above-mentioned bleaching liquor. pH decreased in accordance with the release of available chlorine, resulting in 2 to 3 during bleaching. The results are shown in the following table. Liquor ratio: 1:40, temperature: 75 to 80° C., and periods: 60 minutes.

| | Amount used | Whiteness |
|---|---|---|
| Tetrachloride of PP | 1.0% (4 g.) | 0.835 |
| | 1.5% (6 g.) | 0.855 |
| | 2.0% (8 g.) | 0.866 |
| Tetrachloride of CB | 1.0% (4 g) | 0.830 |
| | 1.4% (5.6 g.) | 0.850 |
| | 1.7% (6.8 g.) | 0.858 |
| | 2.0% (8 g.) | 0.865 |

EXAMPLE 17

10 g. of unbleached cotton yarn (whiteness 0.620) was treated using 400 g. of a bleaching liquor prepared by incorporating 6 g. (1.5%) of the tetrachloride of CB, 0.3 g. of Scourol #900 and 0.3 g. of sodium tripolyphosphate and adjusting pH to 10 with sodium hydroxide. Liquor ratio: 1:40, temperature 75 to 80° C. and period: one hour.

The whiteness of the resultant yarn was 0.870, while that of a similar treatment with the tetrachloride of PP was 0.871.

Examples of sterilizing water with compositions comprising chlorides of PP or CB.

Though the following examples are related to sterilizing of water, the compositions are applicable not only to water, but also to various other objects which need to be sterilized. The sterilizing effects in the examples were about 60 to 70 times that of carbolic acid.

EXAMPLE 18

The tetrachloride of PP was dissolved in water at the following dilution ratios. Various strains of microorganism were added to the solutions. After they were allowed to stand for 5, 10 and 15 minutes, portions of the solutions were used as samples. Each sample was cultivated at 37° C. for 48 hours and inspected. The results are as follows. The inspecting was carried out according to the inspection guide 1 (2) disinfectant of Kanagawa Hygienic Laboratory. Tested strains were *Eschrichia coli* (0–1), *Salmonella typi* (S.57), and *Staphylococus aureus* (209 P.).

| Strain | Dilution ratio of disinfectant | Contact time in minutes | | |
|---|---|---|---|---|
| | | 5 | 10 | 15 |
| Salmonella typi | 1:5,000 | − | − | − |
| | 1:5,500 | + | − | − |
| | 1:6,000 | + | − | − |
| | 1:6,500 | + | − | − |
| | 1:7,000 | + | + | − |
| | 1:7,500 | + | + | + |
| Eschrichia coli | 1:6,000 | − | − | − |
| | 1:6,500 | + | − | − |
| | 1:7,000 | + | − | − |
| | 1:7,500 | + | + | − |
| | 1:8,000 | + | + | + |
| Staphylococus | 1:5,500 | − | − | − |
| | 1:6,000 | + | − | − |
| | 1:6,500 | + | − | − |
| | 1:7,000 | + | + | − |
| | 1:7,500 | + | + | + |

In the contact for one hour at dilution ratio of 1:20,000, the results of testing the strains were all negative.

EXAMPLE 19

Tests were carried out in the same way as in Example 18, using the tetrachloride of CB. The results were as follows:

| Strain | Dilution ratio of disinfectant | Contact time in minutes | | |
|---|---|---|---|---|
| | | 5 | 10 | 15 |
| Salmonella typi | 1:5,000 | − | − | − |
| | 1:5,500 | − | − | − |
| | 1:6,000 | + | − | − |
| | 1:6,500 | + | + | − |
| | 1:7,000 | + | + | − |
| | 1:7,500 | + | + | + |
| Eschrichia coli | 1:6,000 | − | − | − |
| | 1:6,500 | − | − | − |
| | 1:7,000 | + | − | − |
| | 1:7,500 | + | − | − |
| | 1:8,000 | + | + | − |
| | 1:8,500 | + | + | + |
| Staphylococus | 1:5,500 | − | − | − |
| | 1:6,000 | + | − | − |
| | 1:6,500 | + | − | − |
| | 1:7,000 | + | + | − |
| | 1:7,500 | + | + | + |

In the contact for one hour at dilution ratio of 1:20,000, the results of testing the strains were all negative.

EXAMPLE 20

This example relates to sterilizing water of a swimming pool. Each 100 cc. of swimming pool water containing no germicide was sampled by putting it into five vessels and the presence of colitis germs in the samples was examined. The germs were found in two samples among the five. A cloth bag filled with a mixture of the tetrachloride of PP and that of CB was suspended in the pool. In such a condition that one portion of the chlorides was hydrolyzed and the concentration thereof was about 50 p.p.m. (dilution ratio 1:200,000), examination was carried out in the same manner as mentioned above. After 30 minutes, colitis germs were found in one sample among five ones. After one hour, they were no more found in all five samples.

What is claimed is:

1. A composition useful as a bleaching agent, germicide and oxidant comprising a mixture of halides of at least one organic compound selected from the group consisting of (a)
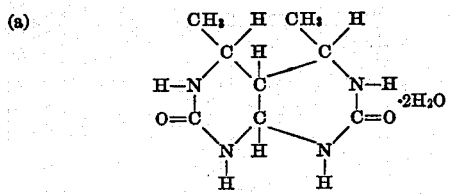

and (b)
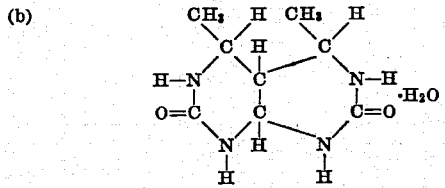

and wherein the halide is at least one chloride selected from the group consisting of (1) the monochloride
(2) the dichloride
(3) the trichloride, and
(4) the tetrachloride.

2. A method for producing a mixture of halides of at least one organic compound selected from the group consisting of (a)
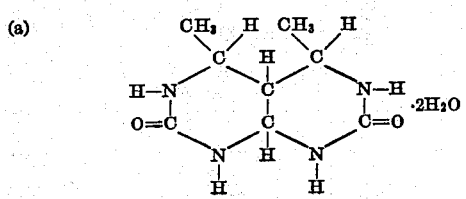

and (b)
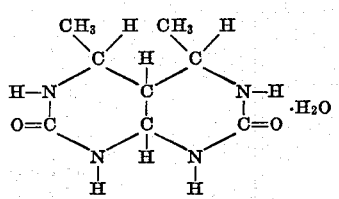

and wherein the halide is at least one chloride selected from the group consisting of (1) monochloride
(2) the dichloride
(3) the trichloride, and
(4) the tetrachloride which comprises suspending a member selected from the group consisting of (a)
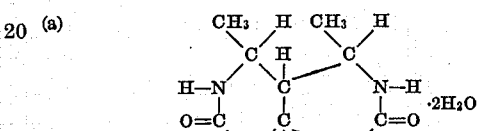

(b)
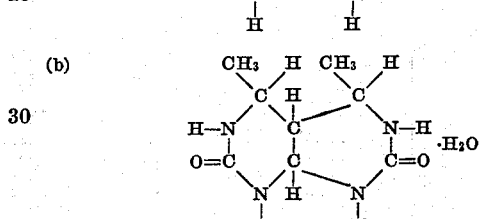

and mixtures of (a) and (b), in an alkaline solution, the pH of which is maintained below 13, and passing chlorine gas into the resultant suspension at a temperature less than 30° C. with stirring for a time sufficient to produce said mixture.

3. The composition according to claim 1 which contains about 17.3% chlorine and has a melting point of from about 98 to about 105° C.

4. The composition according to claim 1 which contains about 24% chlorine and has a melting point of from 100 to about 110° C.

References Cited

UNITED STATES PATENTS

| | | | |
|---|---|---|---|
| 3,055,900 | 9/1962 | Druey et al. | 260—256.4 |
| 3,227,612 | 1/1966 | Gershon | 424—251 |
| 3,242,173 | 3/1966 | Ohnacker et al. | 260—246 |
| 3,335,141 | 8/1967 | Burch | 260—256.4 |

ALBERT T. MEYERS, Primary Examiner

D. M. STEPHENS, Assistant Examiner

U.S. Cl. X.R.

260—256.4